(12) United States Patent
Gottschling

(10) Patent No.: US 11,486,132 B2
(45) Date of Patent: Nov. 1, 2022

(54) CONNECTING ELEMENTS FOR ARRANGING TWO WALL ELEMENTS TOGETHER

(71) Applicant: Steinbach & Vollmann GmbH & Co. KG, Heiligenhaus (DE)

(72) Inventor: Reinhard Gottschling, Essen (DE)

(73) Assignee: Steinbach & Vollmann GmbH & Co. KG, Heiligenhaus (DE)

( * ) Notice: Subject to any disclaimer, the term of this patent is extended or adjusted under 35 U.S.C. 154(b) by 8 days.

(21) Appl. No.: 17/182,356

(22) Filed: Feb. 23, 2021

(65) Prior Publication Data

US 2021/0293015 A1    Sep. 23, 2021

(30) Foreign Application Priority Data

Mar. 18, 2020   (DE) .......................... 102020107453.0

(51) Int. Cl.
| | |
|---|---|
| *E04B 2/00* | (2006.01) |
| *E04B 1/61* | (2006.01) |
| *E04B 1/41* | (2006.01) |
| *E04F 13/08* | (2006.01) |

(52) U.S. Cl.
CPC .............. *E04B 1/6116* (2013.01); *E04B 1/40* (2013.01); *E04F 13/0889* (2013.01)

(58) Field of Classification Search
CPC ....... E04F 13/0889; E04B 1/40; E04B 1/6116
See application file for complete search history.

(56) References Cited

U.S. PATENT DOCUMENTS

| | | | | |
|---|---|---|---|---|
| 2,647,287 A | * | 8/1953 | Jones ..................... | E04B 1/6183 52/582.2 |
| 3,191,244 A | * | 6/1965 | Burke ................. | E05B 65/0817 52/127.9 |
| 3,392,497 A | * | 7/1968 | Cushman .............. | E04B 1/6183 52/272 |
| 3,400,958 A | * | 9/1968 | Haimes ............... | E05B 65/0817 52/127.9 |
| 3,565,469 A | * | 2/1971 | Zwart ................... | E04B 1/6183 52/582.2 |

(Continued)

FOREIGN PATENT DOCUMENTS

| | | |
|---|---|---|
| DE | 2708081 | 8/1978 |
| DE | 20208021 U1 | 8/2002 |

(Continued)

*Primary Examiner* — Basil S Katcheves
(74) *Attorney, Agent, or Firm* — Von Rohrscheidt Patents

(57) ABSTRACT

A connector configured to couple plural wall elements like wall panels, the connector including a coupling including a first support that supports a locking hook that is pivotable from an idle position into an engagement position and movable into an interlocking position; a block including a locking bar that is arranged in a second support wherein the locking hook reaches behind the locking bar in the locking position; and a housing for the coupling or the block, the housing including a housing pass through opening wherein the locking hook passes through the housing pass through opening during a pivot movement from the idle position to the engagement position, wherein the housing includes a first housing half and a second housing half, wherein the housing pass through opening is closed by a cover wall against a pass through of the locking hook.

15 Claims, 14 Drawing Sheets

(56) References Cited

U.S. PATENT DOCUMENTS

| | | | | |
|---|---|---|---|---|
| 3,661,410 A * | 5/1972 | Larson | E05B 65/0817 | 52/127.9 |
| 3,671,006 A * | 6/1972 | Berkowitz | E04B 1/6183 | 249/97 |
| 4,020,613 A * | 5/1977 | Reynolds | E05B 65/0817 | 403/321 |
| 4,417,430 A * | 11/1983 | Loikitz | E04B 1/6183 | 292/111 |
| 4,507,010 A * | 3/1985 | Fujiya | E04B 1/6183 | 292/98 |
| 4,512,122 A * | 4/1985 | Berkowitz | E04B 1/6183 | 29/453 |
| 5,022,200 A * | 6/1991 | Wilson | E04F 15/02 | 52/127.9 |
| 5,212,924 A * | 5/1993 | Finkelstein | B29C 33/14 | 52/127.9 |
| 5,424,118 A * | 6/1995 | McLaughlin | E04B 1/6183 | 428/314.8 |
| 5,452,925 A * | 9/1995 | Huang | E05C 7/04 | 292/57 |
| 5,625,993 A * | 5/1997 | Kelly | E04B 1/4107 | 52/506.05 |
| 5,809,703 A * | 9/1998 | Kelly | E04B 1/4107 | 52/125.5 |
| 5,890,340 A * | 4/1999 | Kafarowski | E04B 1/4128 | 52/704 |
| 6,079,754 A * | 6/2000 | Alexy | E04B 1/6183 | 292/101 |
| 6,276,552 B1 * | 8/2001 | Vervisch | F16K 35/10 | 220/315 |
| 6,299,224 B1 * | 10/2001 | Finkelstein | E04B 1/6183 | 292/240 |
| 6,626,017 B2 * | 9/2003 | Herbeck | F16B 2/18 | 70/63 |
| 6,681,471 B1 * | 1/2004 | Finkelstein | E05C 3/045 | 29/438 |
| 8,528,288 B1 * | 9/2013 | Kinser, Jr. | E04C 2/292 | 52/582.2 |
| 8,966,833 B2 * | 3/2015 | Ally | E04B 1/35 | 52/125.4 |
| 9,803,403 B2 * | 10/2017 | Finkelstein | F16B 5/0004 | |
| 9,863,143 B2 * | 1/2018 | Finkelstein | E05C 19/12 | |
| 10,119,310 B2 * | 11/2018 | Liang | E05B 63/0056 | |
| 10,570,617 B2 * | 2/2020 | Kolcun | B32B 3/20 | |
| 10,829,929 B1 * | 11/2020 | Hansen | E04B 1/6162 | |
| 11,168,492 B1 * | 11/2021 | Liang | E05B 65/0841 | |

FOREIGN PATENT DOCUMENTS

| | | |
|---|---|---|
| DE | 102004042864 A | 3/2006 |
| DE | 102004042864 A1 | 3/2006 |

\* cited by examiner

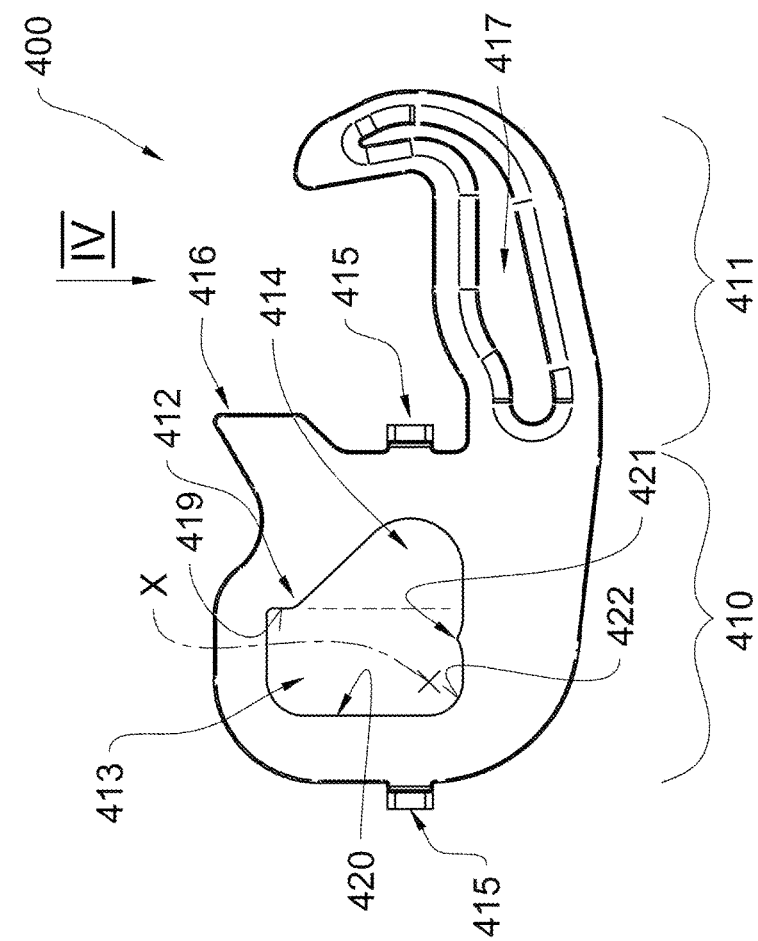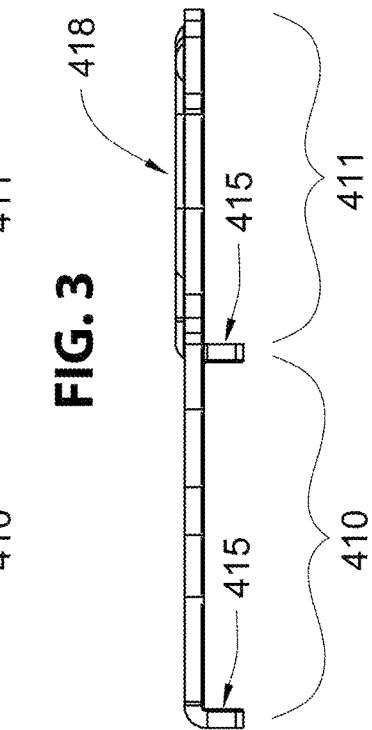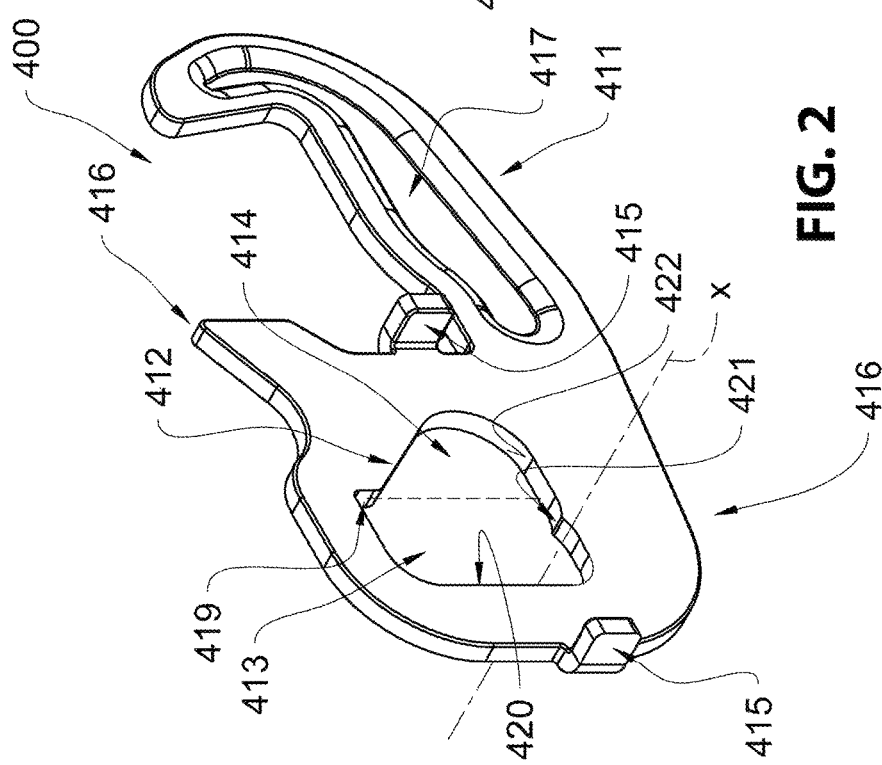

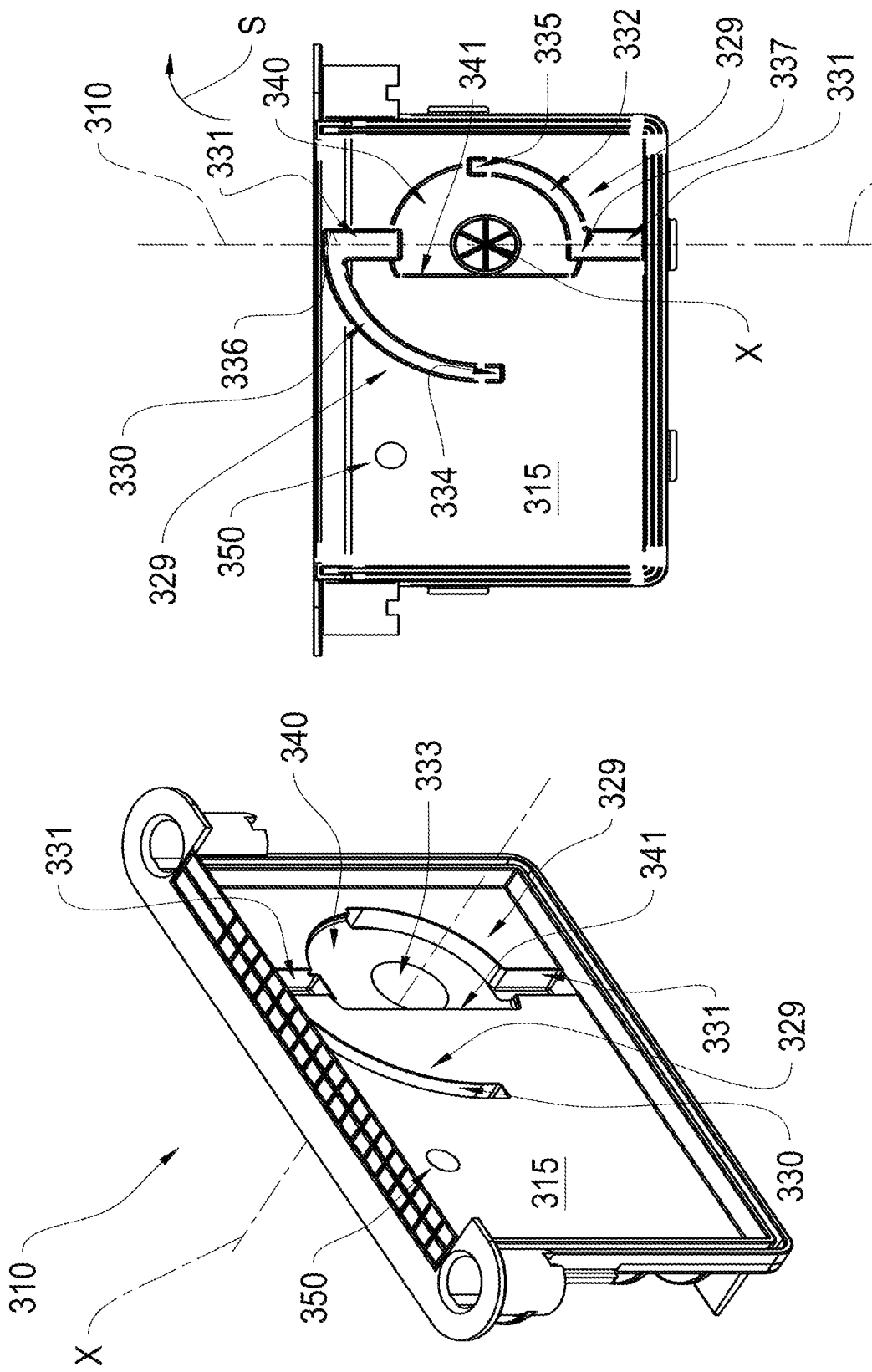

CONNECTING ELEMENTS FOR ARRANGING TWO WALL ELEMENTS TOGETHER

RELATED APPLICATIONS

This application claims priority from and incorporates by reference German patent application DE 10 2020 107 453.0 filed on Mar. 18, 2020.

FIELD OF THE INVENTION

The invention relates to a connector configured to couple plural wall elements like wall panels, in particular insulation panels at each other wherein the wall panels are configured to construct enclosed spaces, in particular cooling spaces.

BACKGROUND OF THE INVENTION

A generic connector for wall elements configured as insulation panels is known e.g. from DE 10 2004 042 864 A1. The connector includes two different components, the so-called block and the so-called coupling. A primary application is connecting insulation panels from which cooling spaces are constructed or that are being used to insulate cooling spaces. The insulation panels typically include a circumferential frame that typically supports a plate on both sides. The frame includes recesses into which the blocks or the coupling are inserted. Thereafter an insulation foam is injected into the intermediate space that is formed by the frame and the sheet metal covering wherein the insulation foam anchors the housings of the block and the coupling firmly after curing. Thus, the housings include an outer surface that is provided with respective ribs wherein the insulation foam penetrates intermediary spaces between the ribs. This way curing the insulation foam yields a form locking connection between the block housing or the coupling housing and the insulation panel.

Each block in a first insulation panel is associated with a coupling in a second insulation panel. The block includes a locking bar in its housing, the coupling, however, includes a pivotable locking hook. The panels are aligned with each other by aligning the blocks with the couplings. Then the locking hook is pivoted from an idle position into an engagement position using a tool e.g. an Allen wrench. Thus the locking hook passes through the opening of the coupling housing and thereafter through the pass through opening of the hook housing thus penetrates into the block housing. The locking hook reaches behind the blocking bar in the engagement position. In order to assure a firm and secure attachment of the panels at each other a rotating pivot movement of the interlocking hook is transposed into a linear pole movement so that the locking hook is returned into the locking housing and clamps the panels together by reaching behind the locking bar.

In order to preinstall the coupling and the block with correct alignment in the frames during a fabrication process of the panels housing that are known in the art that include assembly lugs. The assembly lugs include a recess with a different diameter. The panel frame includes mounting bolts with a diameter that corresponds to a respective receiver. Thus, the coupling and the block can only be preassembled at the frame in a defined orientation.

DE 10 2004 042 864 A1 relates to a panel connector with a simplified configuration. A housing is provided that includes bearings for the interlocking hook and for the locking bar. The locking bar is inserted into the bearing from the outside wherein the locking has to break through a protective wall. The necessary force requires a tube for inserting the locking bar.

The locking hook includes a hook element, an eccentrical disc and a shaft. The hook and the eccentrical disc are inserted into the housing through the pass through opening. The housing is then inserted from an outside into the corresponding bearing and engages the eccentrical element. Also here the housing includes a protective wall above the opening that is configured for inserting the axle. Also here a tool is required for inserting the axle. The protective walls that provide sealing between the housing and the locking bar or between the housing and the axle make pivoting the locking hook more difficult.

The connectors are encased during foaming. Typically an air bubble remains in the tool openings that facilitate inserting the actuation tool that turns the locking hook wherein the air bubble prevents the penetration of foam. The tool openings are rendered accessible after foaming by placing a borehole into the wall element. Foam that may have penetrated can thus be removed by the actuation tool.

In some manufacturing methods it is not impossible that foam material moves into the area of the pass through openings for the locking hook and thus penetrates into the coupling or the block. This is a disadvantage because the function of the panel connector can thus be at least impaired or may even be destroyed. Then care must be taken to remove the foam material that has entered. When this is not possible to a sufficient extent the panel has to be scrapped which increases fabrication costs.

DE 202 08 021 U also discloses a panel connector. The panel connector includes a one-piece housing for the coupling and the block, wherein the coupling is optimized for replacing the hook. The drive axle that pivots the hook is inserted into the housing through an opening from outside. DE 202 08 021 U proposes to close the tool opening with a glue film in order to secure the drive axle and to prevent a penetration of foam.

U.S. Pat. No. 5,452,925 A discloses a generic panel connector wherein the coupling and the block are assembled from two housing halves.

BRIEF SUMMARY OF THE INVENTION

Thus, it is an object of the invention to provide a connector whose function is reliably provided after foam encasing the connector in the wall panel.

The object is achieved by a connector configured to couple plural wall elements like wall panels, the connector including a coupling including a first support that supports a locking hook that is pivotable from an idle position into an engagement position and movable into an interlocking position; a block including a locking bar that is arranged in a second support wherein the locking hook reaches behind the locking bar in the locking position; and a housing for the coupling or the block, the housing including a housing pass through opening wherein the locking hook passes through the housing pass through opening during a pivot movement from the idle position to the engagement position, wherein the housing includes a first housing half and a second housing half, wherein the housing pass through opening is closed by a cover wall against a pass through of the locking hook, wherein the cover wall is provided integrally in one piece by at least one of the first housing half and the second housing half so that a penetration of a foam material into the housing is prevented when the block or the coupling is encased in a wall panel by the foam material, wherein the housing includes a tool opening through which a tool is insertable that is configured to pivot the locking hook, and wherein the tool opening is closed by a closure wall so that a penetration of the foam material into the housing is prevented when the block or the coupling is encased by the foam material in the wall panel.

The invention provides that the housing opening for passing the locking hook through is closed by a cover wall that is advantageously formed by the first housing half in order to prevent a penetration of foam material into the housing during foam encasing the block or the coupling in the insulation panel.

The cover wall reliably prevents an entry of foam material into the housing and thus reliably precludes the problems recited supra from occurring.

Also in alternative wall elements which are e.g. made from liquid or pasty composite materials in which the coupling or the block are embedded, the cover wall described supra has also proven advantageous since it prevents a penetration of wall material. Also in walls that are made from solid materials in which the connector components are inserted e.g. in milled pockets cover walls are advantageous. The cover walls prevent a penetration of chips from the wall material or of dirt during transportation or assembly.

A cover wall can be provided in a particularly advantageous manner when the housing is divided into two housing halves and the cover wall is formed by one of the housing halves though it is also conceivable that each housing wall forms a cover wall section which form a complete cover wall when the housing halves are assembled.

However, when only one of the housing halves forms the cover wall it is possible to provide a support contour for the cover wall wherein the support contour is advantageously formed by the second housing half.

This support contour assures that the cover wall closes the housing pass through opening in a stable manner without gap even when pressure is applied to the cover wall by the foam material.

Then the cover wall is provided as a thin lamella that can be easily punctured by a locking hook that pivots out. Thus, the cover wall can include weak material zones that facilitate a passage of the locking hook. It is also possible to arrange the zones with weakened material in a defined geometric pattern in order to assure a breaking of the cover wall along predetermined contours and lines. This defined breaking of the cover wall prevents undesirable functional impairment of the panel connector.

It is furthermore provided that the housing includes at least one tool opening through which a locking tool is insertable that pivots the locking bar wherein the tool opening is closed by a closure wall in order to prevent a penetration of the foam material into the housing during foam encasing of the block or coupling in an insulation panel.

The closure walls prevent a penetration of the foam material into the tool opening which is typically arranged in the foam filled portion of the panel. This embodiment can be implemented in a particularly advantageous manner when the housing is provided in two pieces since no housing opening is required for inserting the axle of the locking hook. Differently from DE 10 2004 042 864 A1 an insertion from the outside is not required since a mounting in an interior of the housing is facilitated by the housing being provided in two components.

The advantages recited supra with respect to the closure walls are obtained also when other wall materials like composite materials with milled pockets are being used.

It is also provided in this embodiment that the closure wall is formed as a thin lamella that is easily penetrated by the locking tool. Also in this embodiment a defined breaking can be assured by controlled introduction of zones with weakened material.

In a particularly advantageous embodiment it is provided that the locking hook includes a breakthrough protrusion that is pointed in the pivot direction and breaks the cover wall when the locking hook is pivoted into the engagement position.

Providing the locking hook with the breakthrough protrusion provides several options to optimize the passage of the locking hook through a cover wall that closes the pass through opening and to minimize the breakthrough forces.

The connector according to the invention is characterized by a simplified assembly while minimizing a total number of components, in particular of the coupling. This streamlines and simplifies fabrication.

The wall connector according to the invention is useable for wall elements of many types in order to arrange the wall elements at each other when constructing a room. Though the invention is described with reference to insulation panels that are used for constructing cooling rooms it can be applied to furniture construction and to a construction of prefabricated homes. The invention can also be used for quickly constructing temporary housing like on e.g. large construction sites. The terms connector and panel connector are used synonymously.

It is furthermore provided that each housing half includes a bearing for an end of a locking bar of the block so that the locking bar is respectively supported in a housing half with one end, wherein a separation plane of the housing halves if oriented transversal to the longitudinal axis of the locking bar.

It is furthermore alternatively provided that each housing half includes a bearing for one end of the pivot axle of the locking hook so that the pivot axle of the locking hook is supported with one respective end in a respective housing half wherein a separation plane between the housing halves is oriented transversal to a longitudinal axis of the pivot axle.

In an advantageous embodiment each housing half includes bearings for the locking bar and bearings for the pivot axle so that the housing halves are usable optionally to either form the block or the coupling.

This way a housing is provided that includes two housing halves wherein the housing is useable as a housing for the block as well as a housing for the coupling. Thus only two housing halves are required to either produce a coupling or a block.

BRIEF DESCRIPTION OF THE DRAWINGS

The invention is now described based on an advantageous embodiment with reference to drawing figures, wherein:

FIG. 2 illustrates a locking bar of the coupling according to FIG. 1 in a perspective view;

FIG. 3 illustrates the locking bar according to FIG. 2 in a top view;

FIG. 4 illustrates the locking bar according to FIG. 2 in a side view;

FIG. 7 illustrates a first housing half of a panel connector housing according to the invention is a perspective view;

FIG. 8 illustrates the first housing half according to FIG. 7 showing its inside;

DETAILED DESCRIPTION OF THE INVENTION

Figure 1:
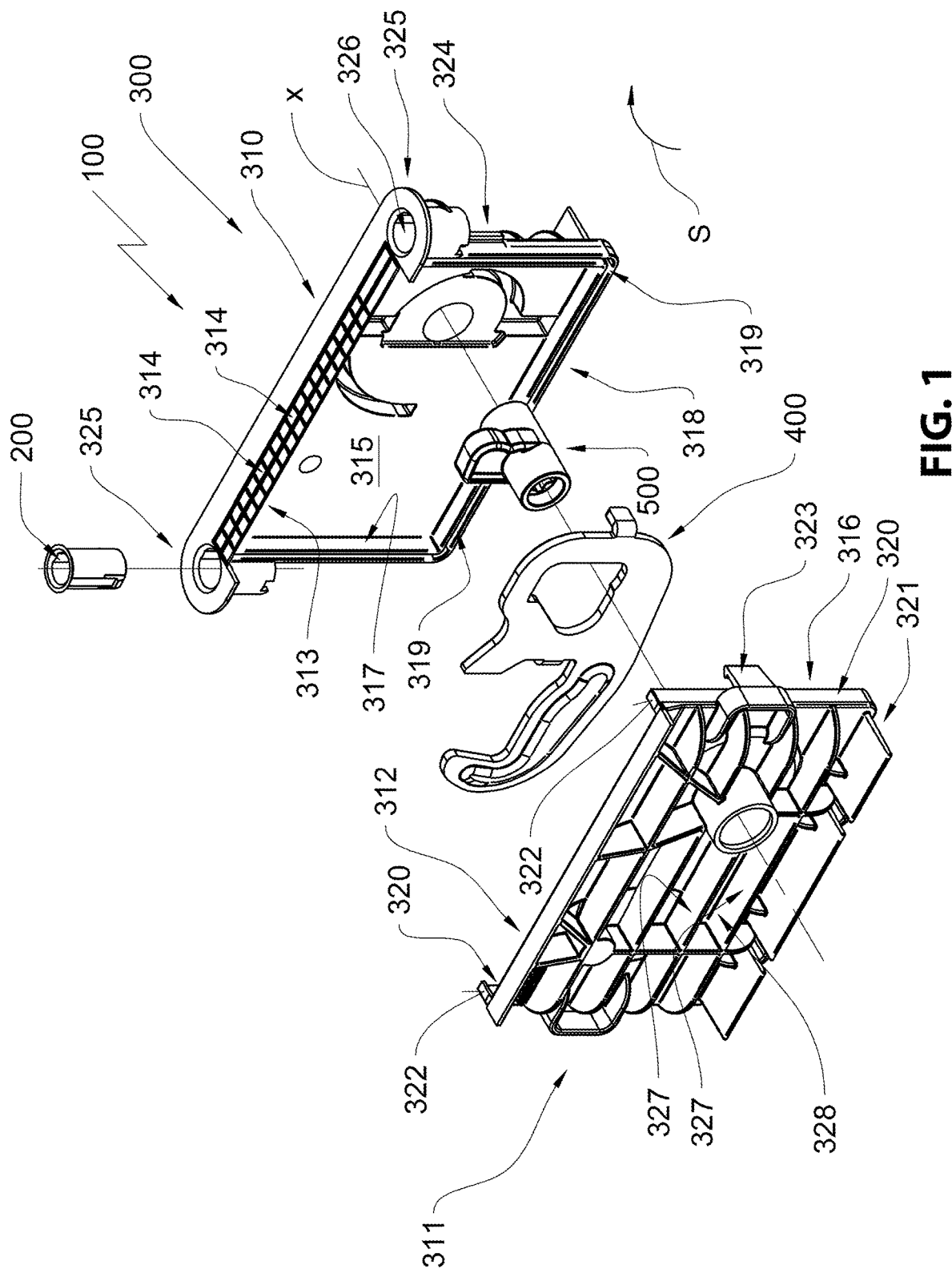
FIG. 1 illustrates a coupling according to the invention for a panel connector in an exploded view.

In the subsequent description the invention is described based on a particular application in insulation panels for cooling rooms. However, all advantages of the invention can also be achieved when used in other wall elements, e.g. in furniture construction or construction of permanent or temporary housing.

The drawing figures illustrate a panel connector with different subassemblies and components. The panel connector includes a coupling designated overall with the reference numeral 100 shown in FIG. 1 in an exploded view. The coupling 100 includes a housing 300 which is assembled from a first housing half 301 and a second housing half 311. A locking hook 400 is inserted into the housing 300 between the housing halves 310, 311 wherein the locking hook sits on a camshaft 500 and is pivotable in the pivot direction S about a geometric pivot axis X.

The housing 300 forms a pass through opening 312 from which the locking hook 400 exits in a pivot direction S during a pivot movement. In the illustrated embodiment the pass through opening 312 is closed by a cover wall 313 that does not necessarily include but advantageously includes weakened material zones 314 configured as groove shaped embossings. The weakened material zones are arranged in a periodically repeating geometric pattern. This facilitates a defined breaking of the cover wall 313 during an initial pivot movement of the locking hook 400 in the pivot direction S.

The housing 300 is separated along a separation plane that extends vertically relative to the pass through opening 312 of the housing, wherein this opening plane corresponds to the plane of the cover wall 313. This corresponds to an orthogonal orientation of the separation plane relative to the geometric pivot axis X of the locking hook 110.

The first housing half 310 includes a receiving groove 319 which extends along face walls 317 that are arranged opposite to each other and a base wall 318 of the first housing wall 310 that connects both face walls 317. The receiving groove 319 is engaged by face walls 320 that are arranged opposite to each other and by a base wall 321 of the second housing half 311 that connects both face walls 320 with each other. In spite of the clearance that is required for the engagement sufficient sealing of the connection of the housing halves 310, 311 is achieved in this area which effectively prevents a penetration of insulation foam material when the insulation panels are being foamed.

The second housing half 311 forms a support contour along narrow sides of the opening and the wide side of the opening that is formed by the contact surfaces 322. The cover wall 313 formed by the first housing half 310 contacts the contact surfaces 322 which form the support contour in the illustrated embodiment when the housing halves 310, 311 are assembled. This way a comparatively thin cover wall 313 is supported along its free longitudinal edge that is oriented towards the second housing 311 and protected against possible pressure effects from the insulating form material while producing the insulation panel. Additionally, the pass through opening 312 is thus closed gap free.

The housing halves 310, 311 are attached at each other by fastening elements which are formed in the instant embodiment as locking hooks 323 at the second housing half 311 and locking protrusions 324 at the first housing half 310. In order to attach the housing halves 310, 311 at each other the locking hooks 323 reach behind the locking protrusions 324 which assures a firm and loss protected arrangement of both housing halves 310, 311 at each other.

The first housing half 310 includes mounting lugs 325 respectively with a mounting opening 326. The mounting lugs provide pre-anchoring and alignment of the housing 300 at a panel frame during fabrication of the insulation material panel. The assembly openings 326 have an identical diameter which can be reduced by reduction sleeves 200.

Figure 9:
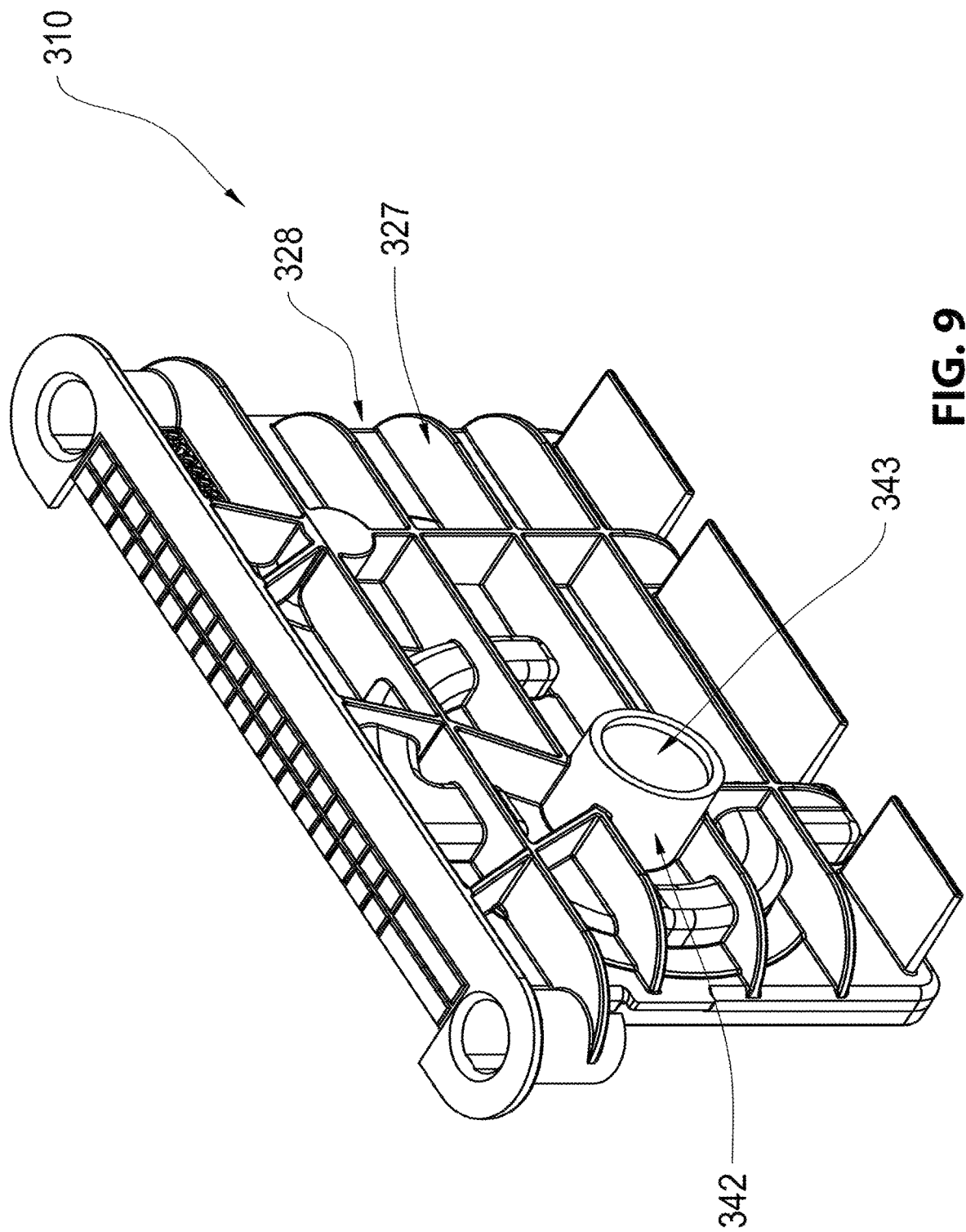
FIG. 9 illustrates a perspective view of the housing half according to FIG. 7 showing its outside.
Figure 11:
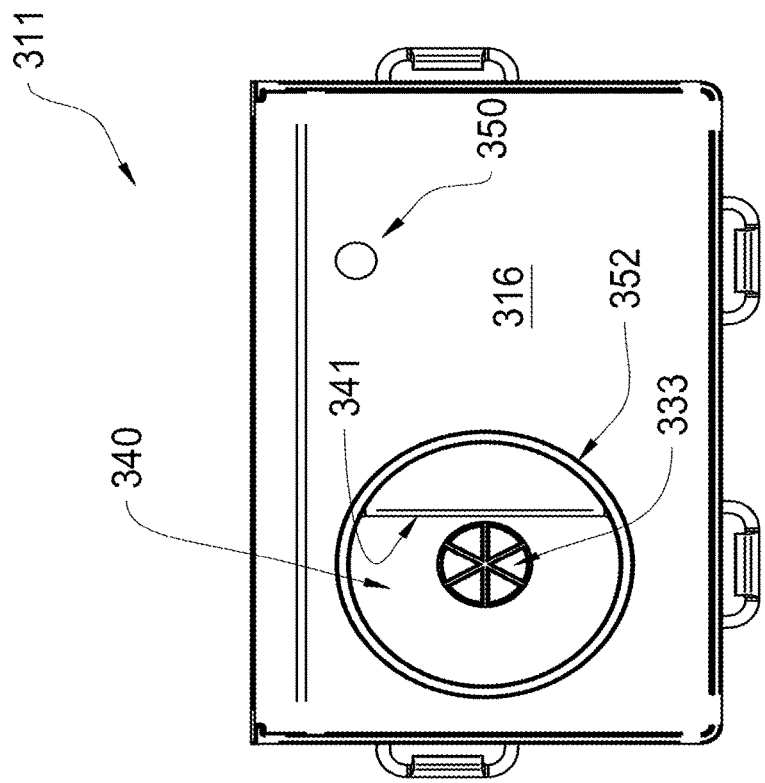
FIG. 11 illustrates a view of the inside of the housing half according to FIG. 10.

FIGS. 7-9 show the first housing half 310 of the housing 300 again. FIG. 7 shows perspective view of the mounted inside 315. FIG. 8 shows a side view of the mounted inside 315. FIG. 9, however, shows the outside of the first housing half 310 that is covered up in FIG. 1.

Circular arc slotted link sections 330, 332 are arranged about the bearing opening 333 for the camshaft 500 and are centered about a geometric pivot axis X of the locking hook 400, whereas the second straight slotted link section 331 extends along a straight-line G that runs vertically through the geometric pivot axis X or that intersects the common center of the circular arc shaped slotted link sections 330, 332.

It is evident in particular from FIG. 9, however, also from FIG. 8 that a bearing opening 333 in the mounted inside 315 is configured as a dead hole and the cylindrical enveloping wall 342 surrounding the bearing opening 333 is closed in an outward direction by a closure wall 343. Also this closure wall 343 is provided with weakened material zones formed as embossing that are represented in FIG. 8 by star or spokes shaped lines.

Figure 10:
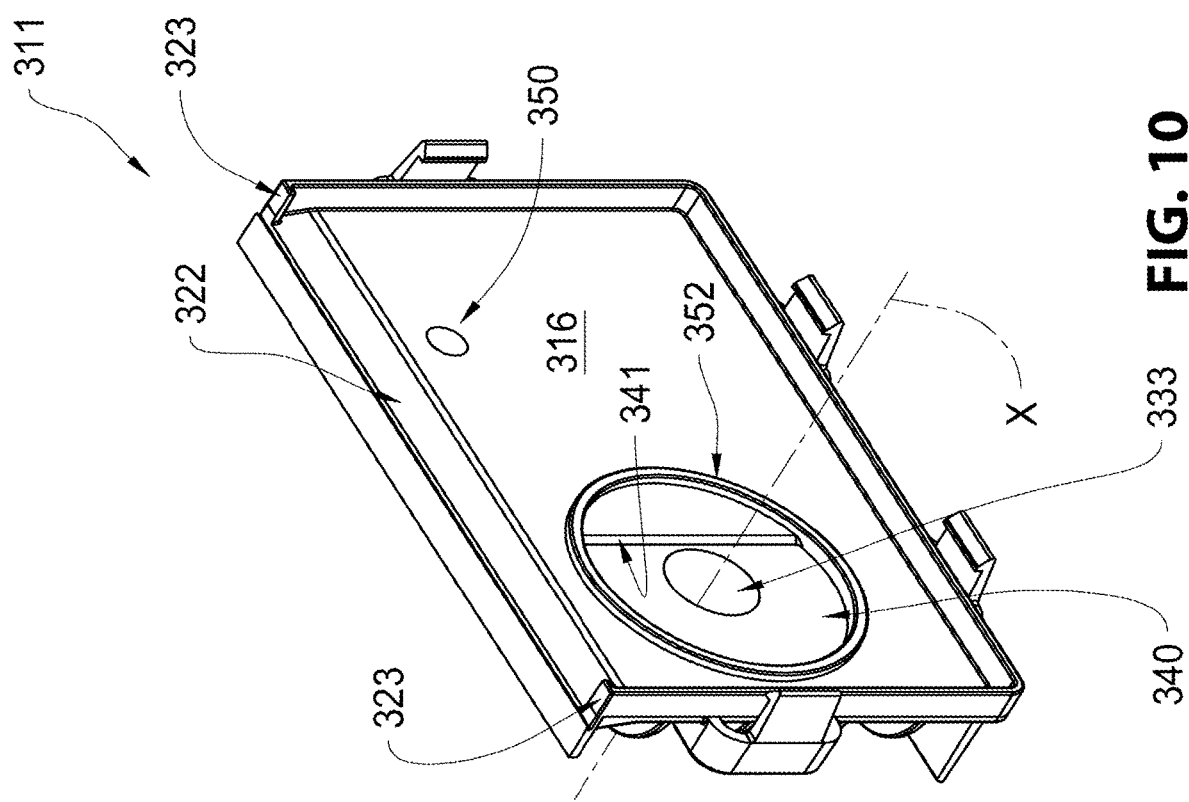
FIG. 10 illustrates the second housing half of a panel connector housing according to the invention in a perspective view of the inside.
Figure 12:
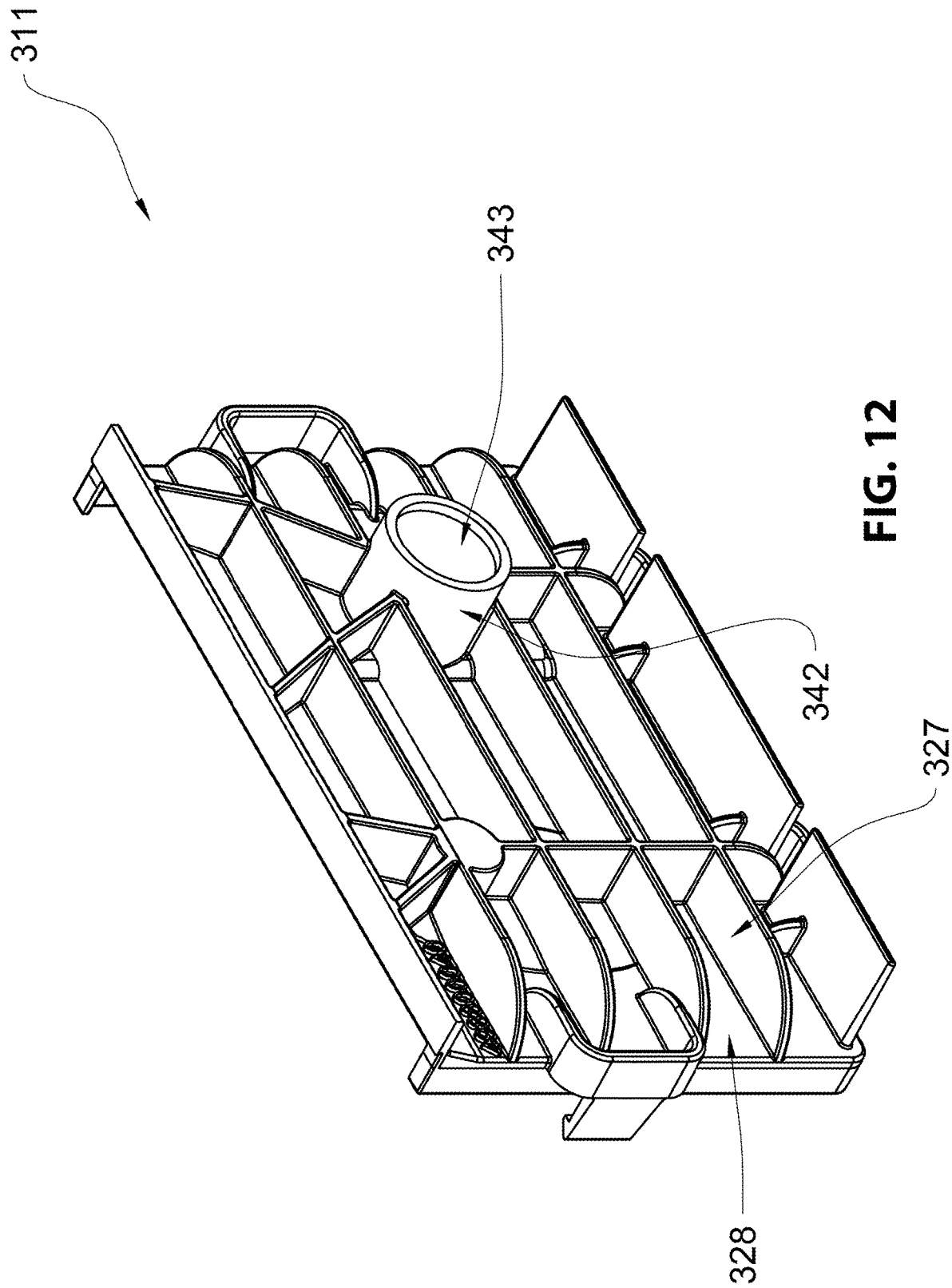
FIG. 12 illustrates a perspective view of the second housing half according to FIG. 10 showing the outside.

FIGS. 10-13 show the second housing wall 311 in different views. FIG. 10 shows a perspective view of the mounted inside 316 and FIG. 11 also shows a view of the mounted inside 316. FIG. 12 shows a perspective view of the outside of the second housing wall 311.

Furthermore, FIG. 10 illustrates the support contour initially configured as contact surface 322 along the longitudinal side of the pass through opening.

Last not least the housing wall 311 also includes a bearing opening 333 for the camshaft 500. This bearing opening is also configured as a dead hole wherein the enveloping cylindrical wall 342 illustrated in FIG. 12 is closed with a closure wall 343 at its outer opening.

FIGS. 2-4 illustrate the locking hook 400 in a perspective view from above and a view of the narrow side.

The locking hook 400 includes a receiving section 410 and a hook section 411.

The receiving section 410 includes a slotted control link 412 formed by a cutout that receives the camshaft 500.

The receiving section 410 of the locking hook 400 forms two control protrusions at an outer circumference wherein the control protrusions are diametrically opposed to each other with respect to the pivot axis X of the locking hook. Furthermore, the receiving section 410 includes a breakthrough protrusion 416 that is oriented in the pivot direction.

Figure 6:
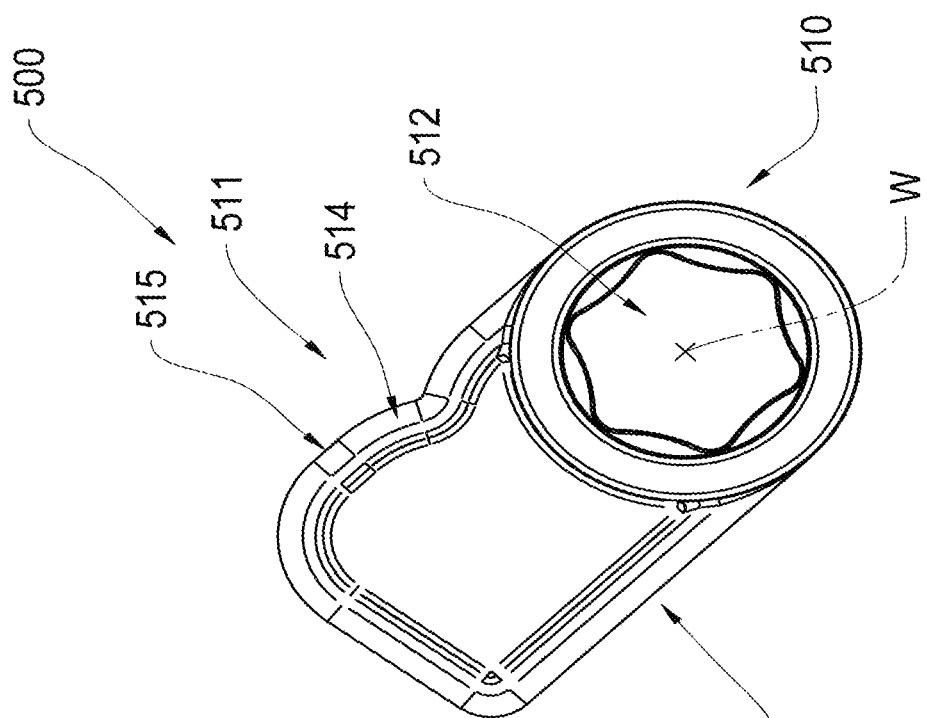
FIG. 6 illustrates the camshaft according to FIG. 5 in a side view.
Figure 5:
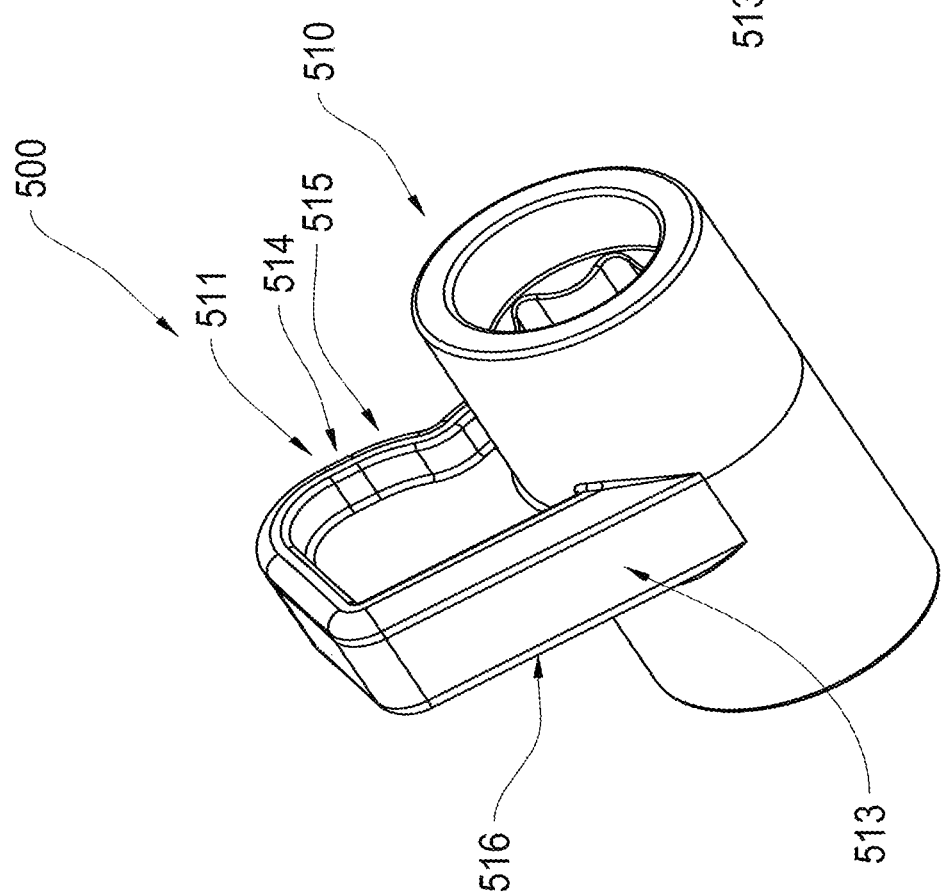
FIG. 5 illustrates the camshaft of the coupling according to FIG. 1 in a perspective view.

FIGS. 5-6 illustrate the camshaft 500 in a perspective view and in a side view. The camshaft 500 includes the shaft 510 and the cam 511 that circumferentially protrudes from the shaft 510.

The shaft 510 includes a tool recess 512 that is parallel and concentric to the shaft axis W wherein a proper tool is insertable into the tool recess.

The camshaft 500 forms a pivot axis of the locking hook 400. The geometric shaft axis W coincides with the pivot axis X.

Figure 13:
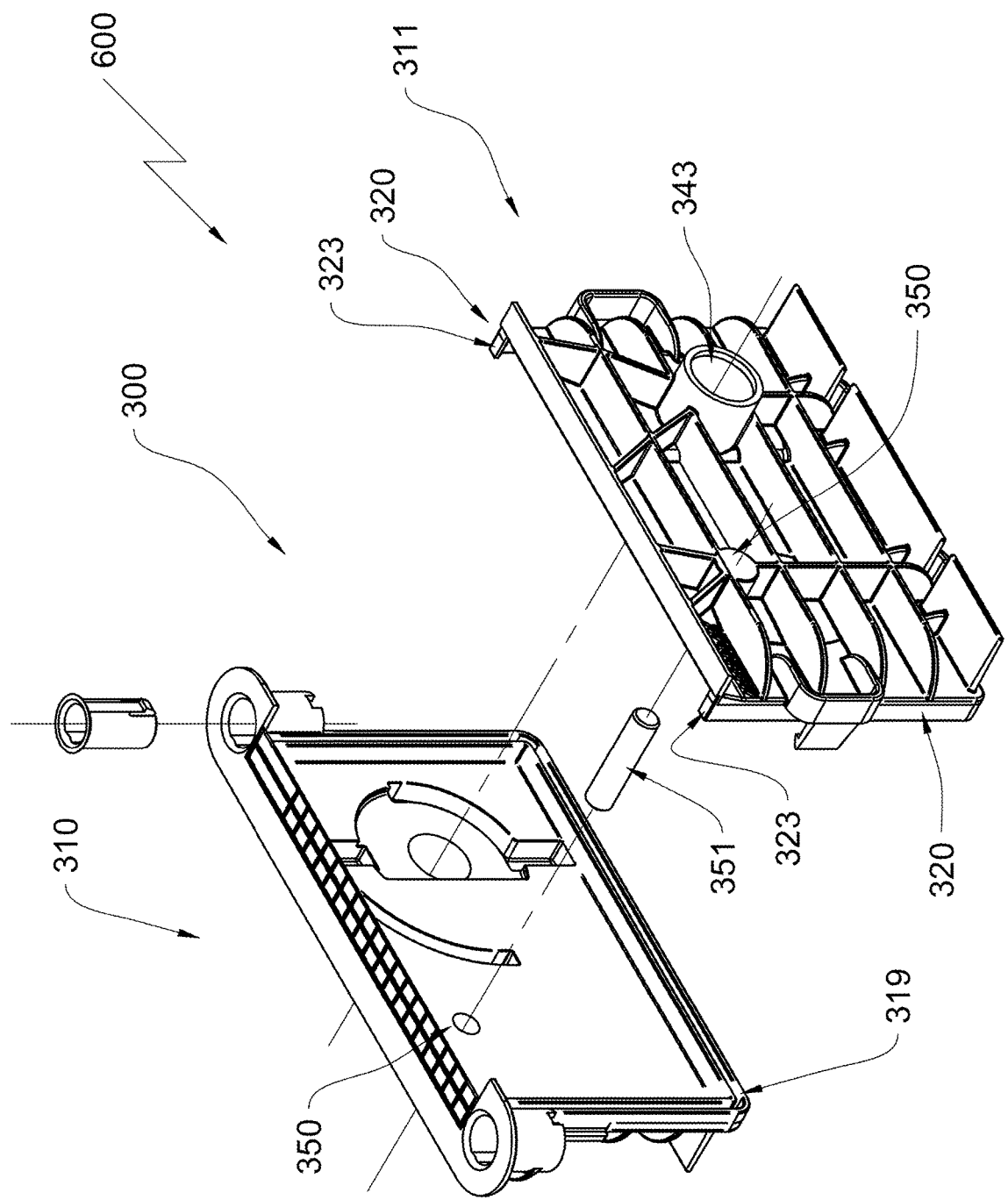
FIG. 13 illustrates a block of a panel connector according to the invention in an exploded view.
Figure 15:
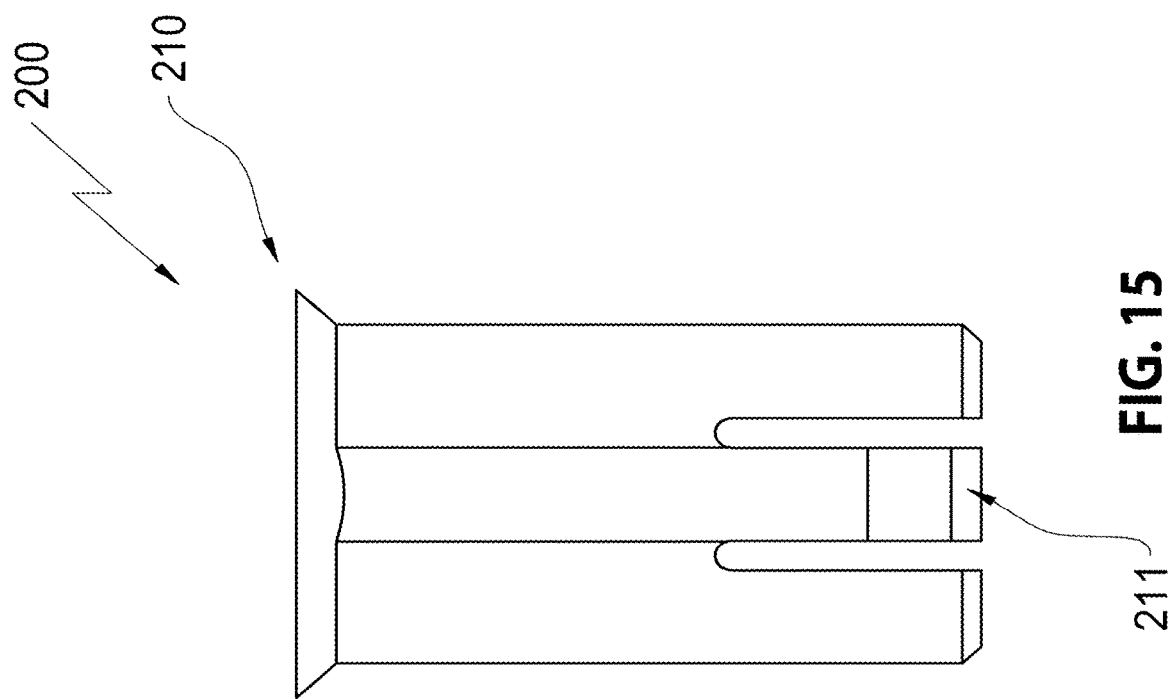
FIG. 15 illustrates the reduction sleeve according to FIG. 14 in a side view.
Figure 14:
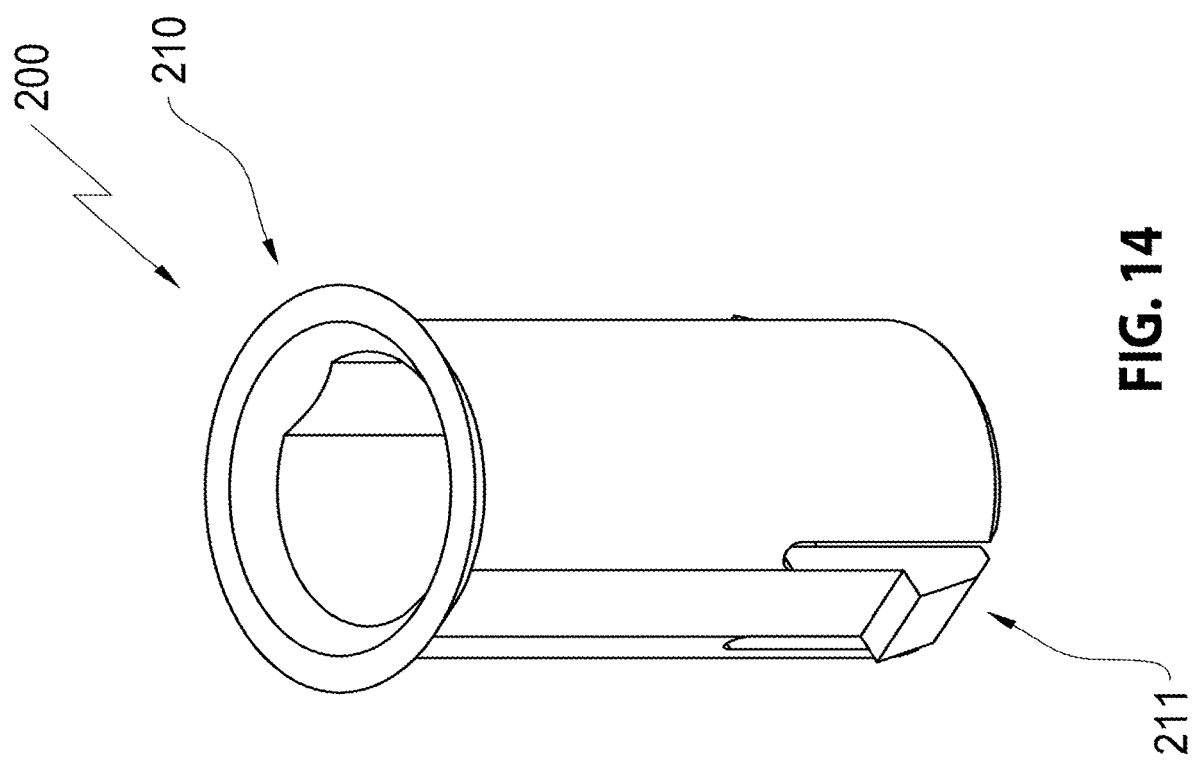
FIG. 14 illustrates a perspective view of a reduction sleeve of a panel connector according to the invention.

FIG. 13 illustrates the second subassembly of the panel connector according to the invention, namely the block designated overall with reference numeral 600. The block 600 includes a housing 300 including a first housing half 310 and a second housing half 311 which correspond to the housing 300 described with respect to the coupling 100 which is being referred to. In the block 600 the bearing recesses 350 are essential which receive the ends of the locking bar 351 and thus anchor the locking bar 351 in the housing 300. The slotted link elements 330, 331, 332 that facilitate the pivot movement of the locking hook 400 can be omitted in this embodiment. However it is an advantage of the invention that the housing 300 of the coupling and the housing 300 of the block are configured identical so that the same housing 300 can be used for fabricating the coupling 100 and the block 600.

Fabrication of the Block

As evident from the exploded view according to FIG. 13 the locking bar 351 can be inserted into the bearing recess 350 of the first housing half 310 since the housing is provided in two components. Thus, the locking bar 351 is inserted from the housing inside in a direction towards the housing outside into the bearing recess 350, wherein the bearing recess 350 is closed towards the outside. The preassembled unit including the first housing half 310 and the locking bar 351 is now joined with the second housing half 311. Thus, the face walls 320 and the base wall 321 of the second housing half 311 engage the receiving groove 319 of the first housing half 310. The cover wall 313 of the first housing half 310 contacts the contact surfaces 322 that form the support contour. The bearing openings 333 for the camshaft 500 that is not used in the block 600 are closed in an outward direction by closure walls 343. Thus, an interior of the block is substantially sealed towards an exterior so that no foam material can penetrate into the interior of the block during fabrication of the insulation panel.

Fabrication of the Coupling

The coupling 100 of the panel connector according to the invention is assembled in a similar manner which is best explained based on the exploded view according to FIG. 1 and the FIGS. 7-12. First the shaft 510 of the camshaft 500 is inserted into the bearing opening 333 until the cam 511 is seated in its receiving recess 340 with a lobe 514 that is oriented towards the mounted inside 315. Thus, the cam 511 is oriented vertically in a direction towards the pass through opening 312 or the cover wall 313 and contacts the cord wall 314 of the receiving recess 340 with a backside 513.

The locking hook 400 is applied to the mounted inside 315 of the first housing wall 310, wherein the receiving space 413 of the slotted control link 412 receives the camshaft 500. Thus, the rear surface 513 of the cam 511 contacts an opposite rear surface section 519 of the slotted control link 412. The front surface 515 of the cam 511 is oriented towards the cam support surface 420 of the slotted control link 412 of the locking bar 400. The control protrusions 415 engage the slotted control link 329, namely the first slotted control link section 330 and the third slotted control link section 332 and respectively contact the first movement end stop 334, 335 of the slotted control link sections 330, 332.

The locking hook 400 is arranged in its entirety in the interior of the housing 300 and its longitudinal extension is oriented approximately parallel to a plane of the pass through opening 312 or the plane of the cover wall 313. The locking hook is in its idle position. Now, the second housing half 311 is placed on the first housing half 310 wherein the face walls 320 and the base wall 321 penetrate into the receiving groove 319 of the first housing half 310. The cover wall 313 contacts the contact surfaces 322 that form the support contour. Thus, the second end of the shaft 510 of the camshaft 500 penetrates the bearing opening 333 of the second housing wall 311. The cam 511 contacts a receiving recess 340 of the second housing half 311 with a side lobe 516 that is oriented towards the mounted inside 316. The rear surface 513 of the cam 511 contacts the cord wall 341 of the receiving recess 340 also in this embodiment.

The engagement hooks 323 of the second housing wall 311 reach behind the engagement protrusions 324 of the first housing wall 310 which implements the coupling 100. The existing closure walls 343 and the cover wall 313 seal a housing interior space of the coupling 100 against a penetration of foam material when producing an insulation panel.

Movement of the Locking Hook

FIGS. 16-19 show the first housing half 310 of the housing 300 of the coupling 100 in a view of the mounted inside 315 of the first housing wall 310 with the mounted locking hook 400 and the mounted camshaft 500. It is appreciated that FIGS. 16-19 show the locking hook 400 in various positions. The pivoting and movement process of the locking hook 400 of the coupling 100 from an idle position through the engagement position and into the locking position will now be described with reference to FIGS. 16-19.

Figure 16:
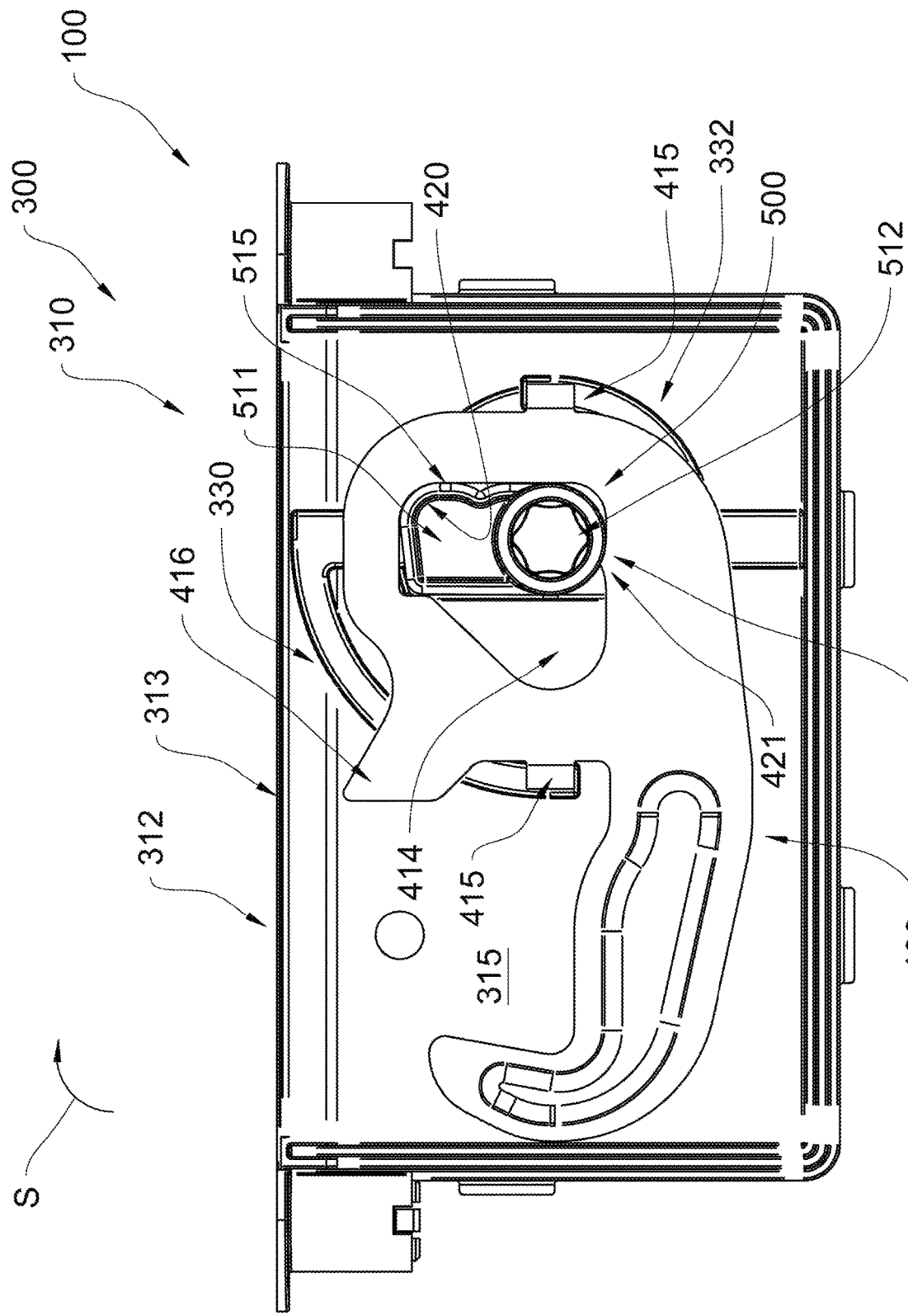
FIGS. 16-20 illustrate views of the first housing half of the panel connector according to the invention with a mounted locking hook in various pivot positions.

FIG. 16 shows the locking hook in its idle position. In the idle position the locking hook is entirely supported within the housing 300.

Starting from the idle position the locking hook 400 is moved by a pivot movement in a pivot direction S wherein a pivot tool like an Allen wrench is insertable from the housing outside into the tool recess of the camshaft 500. When the bearing opening 333 is provided on an outside with a closure wall 343 (not illustrated in FIGS. 16-19) the closure wall is penetrated by the tool engaging the tool opening 512.

Pivoting the locking hook 400 out causes the locking hook to engage the housing 300 of the block 600 and to reach behind the locking bar 351 arranged therein. For this purpose the block 600 is oriented with its pass through opening 312 towards the pass through opening 312 of the coupling 100 so that the locking hook 400 passes through the pass through openings 312 of the coupling 100 and the block 600.

The locking hook 400 engages the first slotted control link section 330 and the third slotted control link section 332 with its control protrusions 415 which control the rotating pivot movement of the locking hook 400. Rotating the camshaft 500 in the pivot direction S supports the front face 515 of the cam 511 at the cam support surface 420 of the slotted control link 412 at the locking hook. The shaft 510 is supported with its outer circumference at a support lug 421 that protrudes in a direction towards the slotted control link interior or towards a receiving cavity 413 of the locking hook 400. The support lug 421 reacts circumferential forces generated by the cam 511 when pivoted in the pivot direction S and thus prevents a penetration of the shaft 510 into the movement cavity of the slotted control link 412 at the locking hook during the pivot process.

Figure 17:
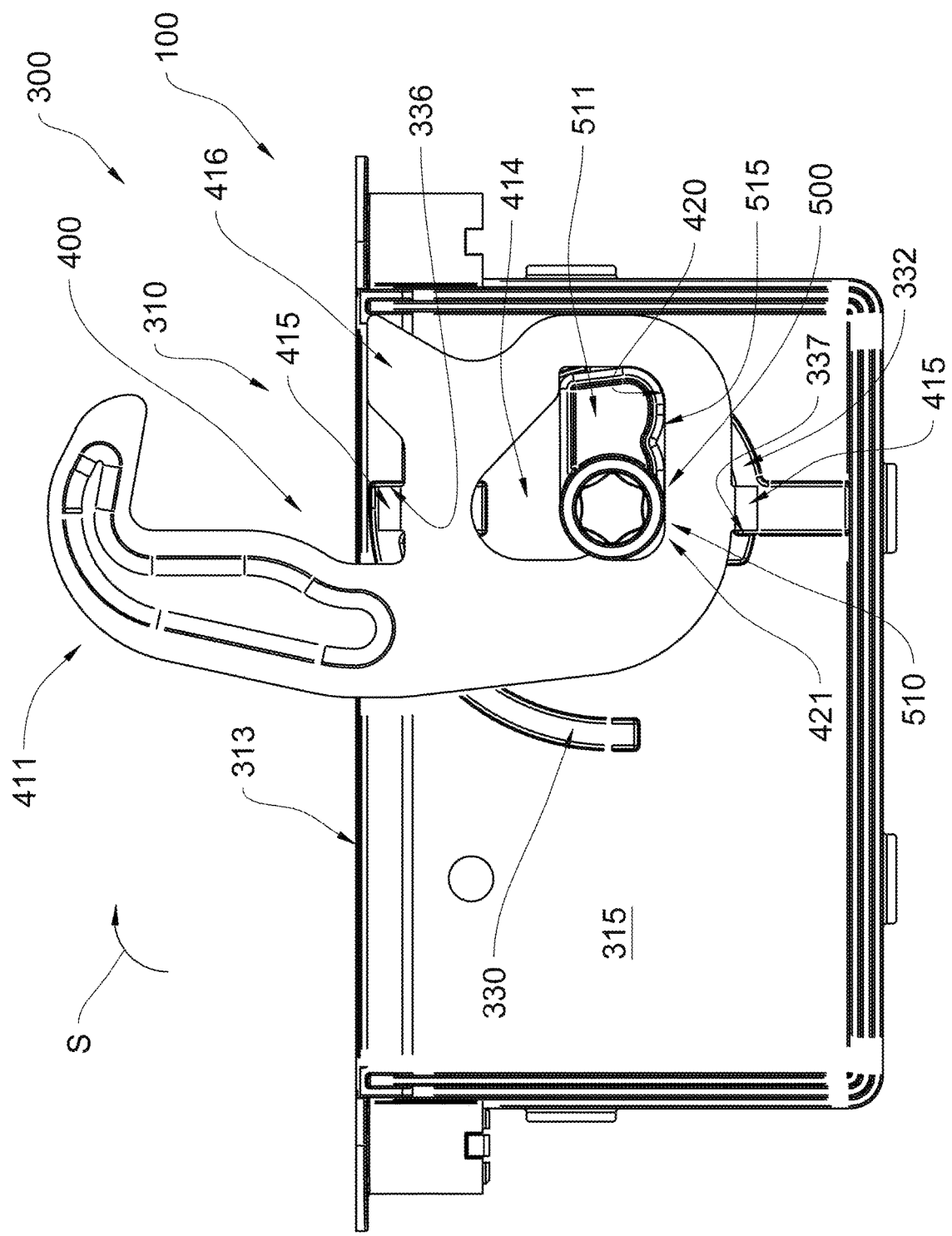

In FIG. 17 the locking hook is arranged in an engagement position. Pivoting the locking hook 400 out terminates after pivoting by proximately 90-degrees since the control protrusions 415 contact the respective second movement stop 336, 337 of the first slotted control link section 330 or the third slotted control link section 332.

In the engagement position the hook section 411 of the locking hook 400 engages the housing 300 of the block 600 and reaches behind the locking bar 351 arranged therein.

In this position of the locking bar 400 its control protrusions 415 are in the entry portion of the second straight slotted link section 331 that extends between the second end stops 336, 337 of the first slotted control link section 330 and the third slotted control link section 332.

Figure 18:
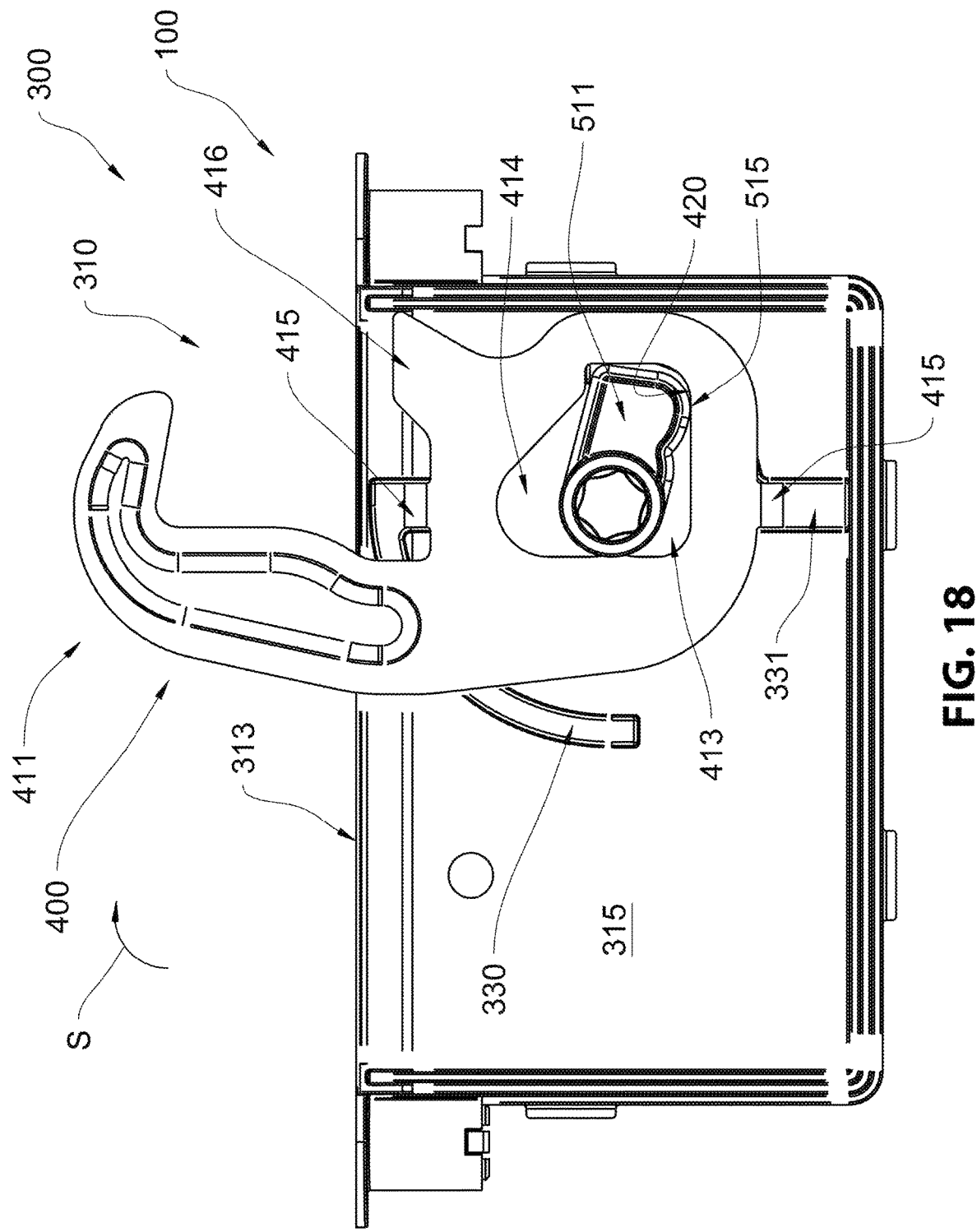

When rotating the cam 510 further in the pivot direction S the cam 511 presses increasingly against the cam support surface 420. Since a further rotation of the locking hook 400 is rendered impossible by the movement end stops 336, 336 forces that were reacted so far by the support lug 421 increase. The movement clearance of the shaft 510 and the cam 511 in the receiving cavity 413 facilitates an over lift of the shaft 510 over the support lug 421 as illustrated in FIG. 18. when a sufficient circumferential force is provided. This over lift simultaneously provides a displacement of the locking hook along the second slotted control link section 332 in a linear manner into the coupling housing and a passing of the shaft 510 from the receiving cavity 413 into the escapement space 414 of the slotted control link 412.

The linear reset movement of the locking hook 400 into the housing 300 of the coupling 100 with respect to the drawing plane of FIG. 18 a downward movement is controlled by the control protrusions 415 of the locking hook 400 engaging the second slotted control link section 331. This linear movement transfers the locking hook 400 into its locking position where it clamps against the locking bar 351 of the block 600.

Figure 19:
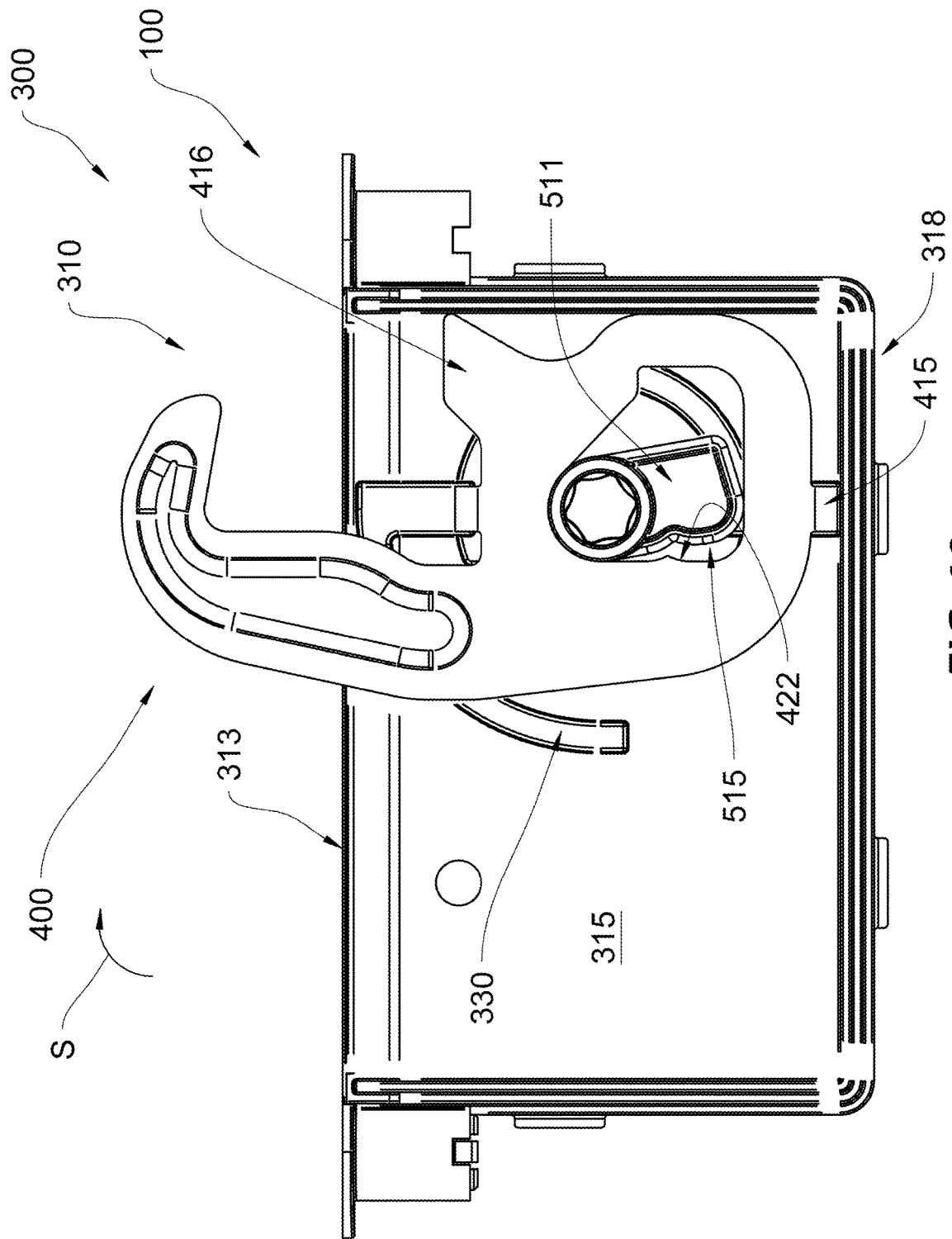
Figure 20:
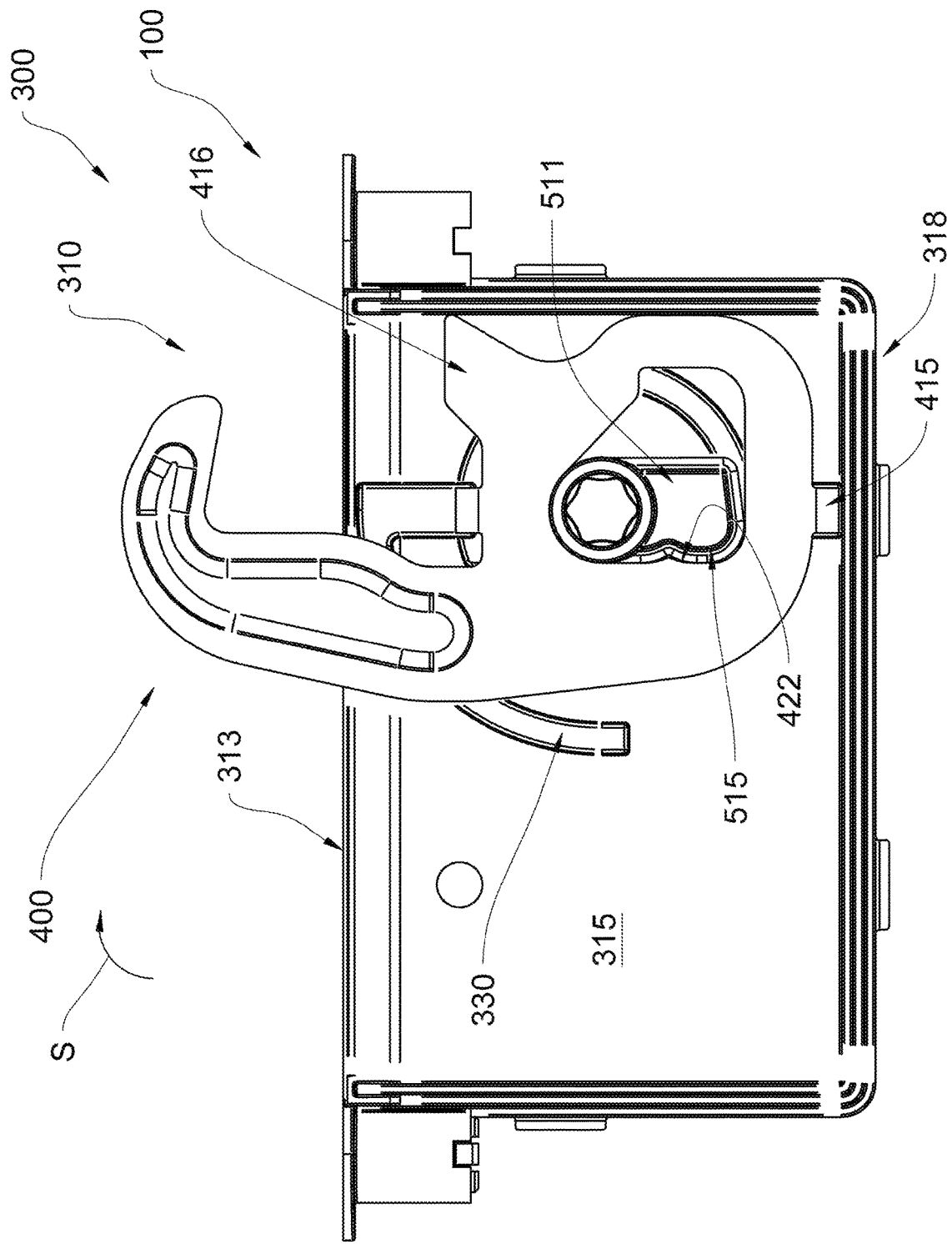

The locking position of the locking hook 400 is illustrated in FIG. 19. The locking hook 400 has completed its linear movement into the housing 300 since the control protrusion 415 that is proximal to the floor wall 318 contacts the floor wall 318 or a movement stop of the second slotted link section 331. In this position of the locking hook 400 the panels that are to be connected are firmly coupled with each other and are preloaded relative to each other.

FIGS. 16-19 show how the locking hook 400 breaks through the cover wall 313.

When pivoting the locking hook 400 in the pivot direction S the breakthrough protrusion 416 impacts the cover wall 313 either before the hook section 411 or simultaneously therewith depending on the configuration of the locking hook 400. Continuing the pivot movement causes a breakthrough of the cover wall 313 so that the hook section 411 of the locking hook 400 can exit from the housing 300 of the coupling 100. During exit the hook section 411 as well as the breakthrough protrusion 416 impact the cover wall 313 of the housing 300 of the block 600. Thus, the breakthrough occurs anomalously so that the hook section 411 of the locking hook 400 can penetrate the housing 300 of the block 600.

The function of the rib 352 at the second housing half 311 and of the material bulge 418 of the locking hook 400 in cooperation with the second housing half 311 will be described infra.

When the housing halves 310, 311 are assembled the receiving section 410 contacts the rib 352 of the assembled inside 316 of the second housing half 311. This provides a very small contact surface of the receiving section 411 at the mounted inside 316 of the second housing half 311 which minimizes friction during the pivot movement.

The material bulge 418 also contacts the mounted inside 316 of the second housing half 311. A thickness of the material bulge 418 corresponds to a thickness of the rib 352. This stabilizes the hook 400 against transversal forces during a pivot movement so that a pivot movement of the locking hook 400 during the outward pivoting is reliably prevented.

REFERENCE NUMERALS AND DESIGNATIONS

100 Coupling
200 Reduction Sleeve
210 Contact edge
211 Interlocking arm
300 Housing
310 First housing half
311 Second housing half
312 Pass through opening
313 Cover wall
314 Weakened material zone
315 Mounted inside of 310
316 Mounted inside of 311
317 Face wall of 310
318 Base wall of 310
319 Receiving groove
320 Face wall of 311
321 Base wall of 311
322 Contact service/support contour
323 Locking hook
324 Locking protrusion
325 Mounting lug
326 Mounting opening
327 Rib
328 Recess
329 Slotted control link
330 First slotted control link section
331 Second slotted control link section
332 Third slotted control link section
333 Bearing opening of 311
334 First movement end-stop of 330
335 First movement end-stop of 332
336 Second movement end stop of 330
337 Second movement end stop of 332
340 Receiving recess
341 Cord wall
342 Enveloping cylindrical wall
343 Closure wall
350 Bearing recess
351 Locking bar
352 Rib
400 Locking hook 410 Receiving section
411 Hook section
412 Slotted control link
413 Receiving cavity
414 Escapement cavity
415 Control protrusion
416 Breakthrough protrusion
417 Embossing
418 Material Bulge
419 Rear surface opposite section
420 Cam support surface
421 Support lug
422 Contact surface
500 Camshaft
510 Shaft
511 Cam
512 Tool recess
513 Rear surface
514 Side lobe
515 Front surface
516 Side lobe
600 Block
G Straight line
S Pivot direction
X Geometric pivot axis
W Pivot axis

What is claimed is:

1. A connector configured to couple plural wall panels, the connector comprising:
a coupling including a first support that supports a locking hook that is pivotable from an idle position into an engagement position and movable into an interlocking position;
a block including a locking bar that is arranged in a second support wherein the locking hook reaches behind the locking bar in the locking position; and
a respective housing for each of the coupling and the block, the respective housing including a housing pass through opening wherein the locking hook passes through the housing pass through opening during a pivot movement from the idle position to the engagement position,
wherein the respective housing includes a first housing half and second housing half,
wherein the housing pass through opening of the coupling and the block is closed by a cover wall against a pass through of the locking hook and openable by the pivot movement of the locking hook from the idle position to the engagement position,
wherein the cover wall is provided integrally in one piece by at least one of the first housing half and the second housing half so that a penetration of a foam material into the respective housing is prevented when the block or the coupling is encased in a wall panel by the foam material,
wherein the respective housing includes a tool opening through which a tool is insertable that is configured to pivot the locking hook, and
wherein the tool opening is closed by a closure wall so that a penetration of the foam material into the respective housing is prevented when the block or the coupling is encased by the foam material in the wall panel.

2. The connector according to claim 1,
wherein the cover wall or the closure wall includes weakened material zones, and
wherein the cover wall or the closure wall are breakable along the weakened material zones.

3. The connector according to claim 1,
wherein a support structure is provided for the cover wall, and
wherein the support structure is formed by another of the first housing half and the second housing half.

4. The connector according to claim 1,
wherein the locking hook includes a breakthrough protrusion oriented in the pivot direction that breaks the cover wall when the locking hook pivots into the engagement position.

5. The connector according to claim 1, wherein an entire configuration of the first housing half of the coupling is structurally identical to an entire configuration of the first housing half of the block and an entire configuration of the second housing half of the coupling is structurally identical to an entire configuration of the second housing half of the block.

6. A connector configured to couple plural wall panels, the connector comprising:
a coupling including a first support that supports a locking hook that is pivotable from an idle position into an engagement position and movable into an interlocking position;
a block including a locking bar that is arranged in a second support wherein the locking hook reaches behind the locking bar in the locking position; and
a respective housing for each of the coupling and the block, the respective housing including a housing pass through opening wherein the locking hook passes through the housing pass through opening during a pivot movement from the idle position to the engagement position,
wherein the respective housing include a first housing half and a second housing half,
wherein the housing pass through opening of the coupling and block is closed by a cover wall against a pass through of the locking hook and openable by the pivot movement of the locking hook from the idle position to the engagement position, and
wherein the cover wall is provided integrally in one piece by at least one of the first housing half and the second housing half so that a penetration of a foam material into the respective housing is prevented when the block or the coupling is encased in a wall panel by a foam material.

7. The connector according to claim 6,
wherein the cover wall includes weakened material zones, and
wherein the cover wall is breakable along the weakened material zones.

8. The connector according to claim 6,
wherein a support structure is provided for the cover wall, and
wherein the support structure is formed by another of the first housing half and the second housing halt.

9. The connector according to claim 6,
wherein the locking hook includes a breakthrough protrusion oriented in the pivot direction that breaks the cover wall when the locking hook pivots into the engagement position.

10. The connector according to claim 6, wherein an entire configuration of the first housing half of the coupling is structurally identical to an entire configuration of the first housing half of the block and an entire configuration of the second housing half of the coupling is structurally identical to an entire configuration of the second housing half of the block.

11. A connector configured to couple plural wall panels, the connector comprising:
- a coupling including a first support that supports a locking hook that is pivotable from an idle position into an engagement position and movable into an interlocking position;
- a block including a locking bar that is arranged in a second support wherein the locking hook reaches behind the locking bar in the locking position; and
- a respective housing for each of the coupling and the block, the respective housing including a housing pass through opening wherein the locking hook passes through the housing pass through opening during a pivot movement from the idle position to the engagement position,
- wherein the respective housing includes a first housing halt and a second housing half,
- wherein the housing pass through opening of the coupling and the block is closed by a cover wall against a pass through of the locking hook and openable by the pivot movement of the locking hook from the idle position to the engagement position,
- wherein the respective housing includes a tool opening through which a tool is insertable that is configured to pivot the locking hook, and
- wherein the tool opening is closed by a closure wall so that a penetration of a foam material into the respective housing is prevented when the block or the coupling is encased by, the foam material in a wall panel.

12. The connector according to claim 11,
- wherein the cover wall or the closure wall includes weakened material zones, and
- wherein the cover wall or the closure wall are breakable along the weakened material zones.

13. The connector according to claim 11,
- wherein a support structure is provided for the cover wall, and
- wherein the support structure is formed by another of the first housing half and the second housing half.

14. The connector according to claim 11,
- wherein the locking hook includes a breakthrough protrusion oriented in the pivot direction that breaks the cover wall when the locking hook pivots into the engagement position.

15. The connector according to claim 9, wherein an entire configuration of the first housing half of the coupling is structurally identical to an entire configuration of the first housing half of the block and an entire configuration of the second housing half of the coupling is structurally identical to an entire configuration of the second housing half of the block.

* * * * *